May 22, 1945.         J. R. STEINHOFF         2,376,730
APPARATUS FOR SONIC DETECTION
Filed April 17, 1942         5 Sheets-Sheet 1
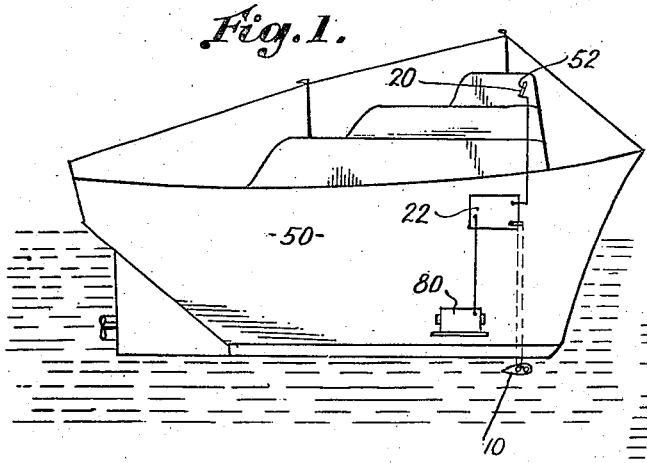
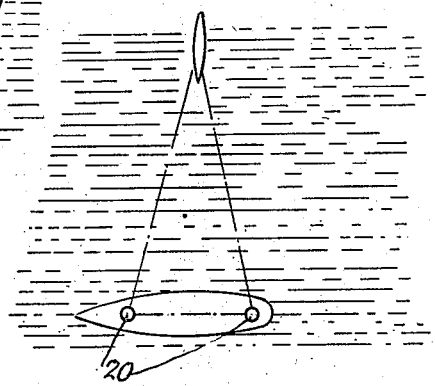
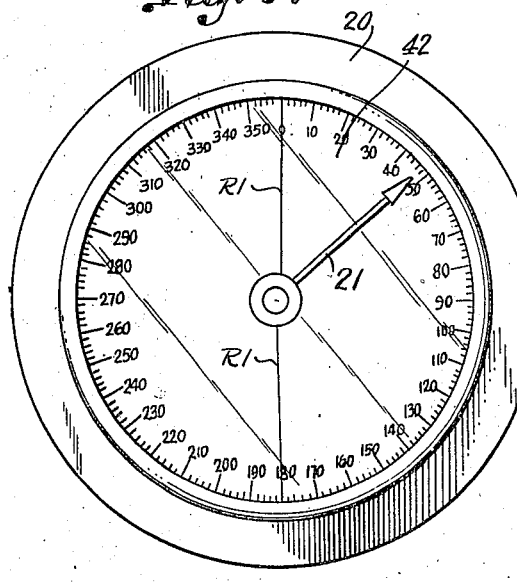
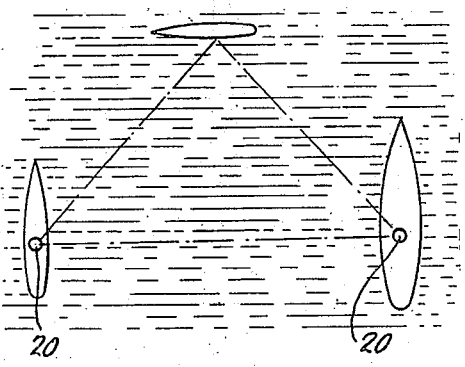
Inventor
JOHN R. STEINHOFF.
By Archibald R. McCallum
Attorney May 22, 1945.  J. R. STEINHOFF  2,376,730
APPARATUS FOR SONIC DETECTION
Filed April 17, 1942   5 Sheets-Sheet 2
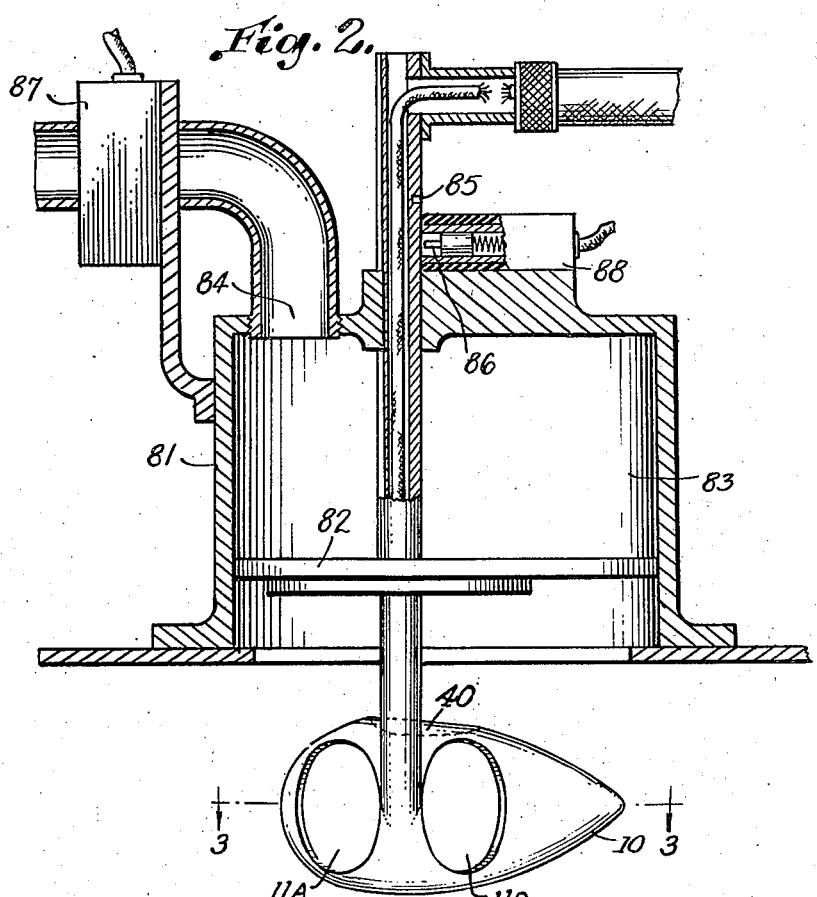
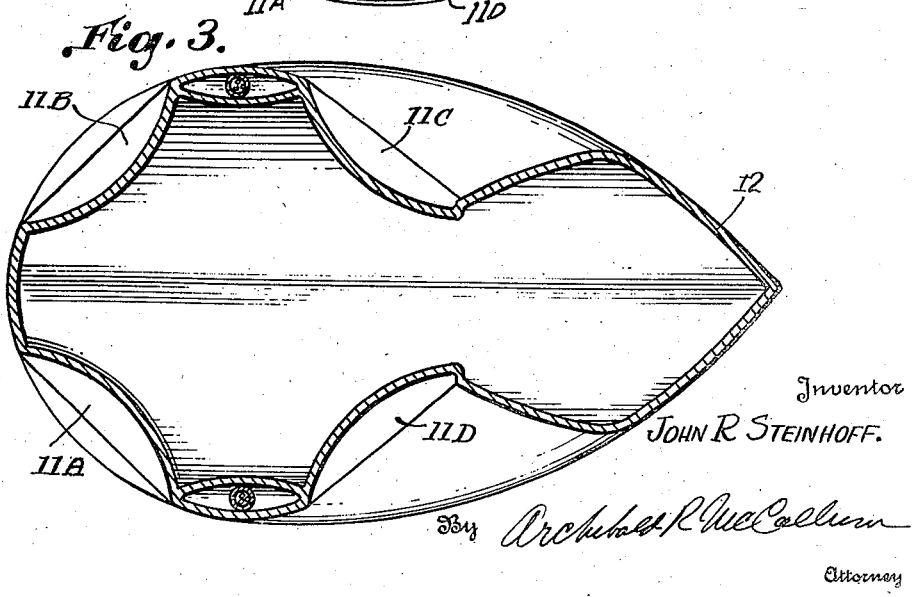
Inventor
JOHN R STEINHOFF.
By Archibald R McCollum
Attorney

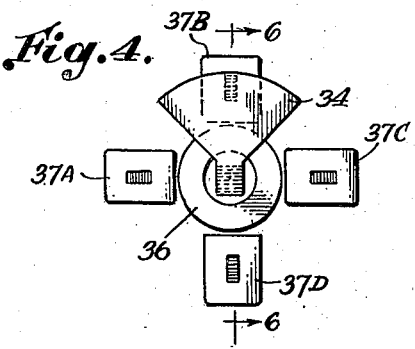
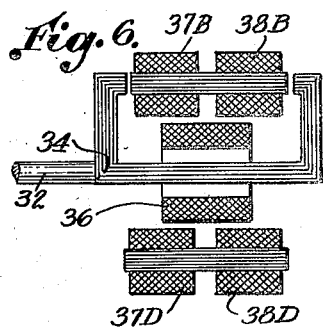
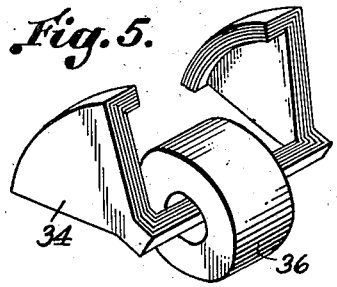
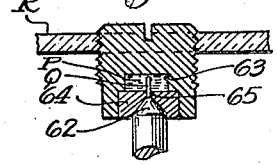
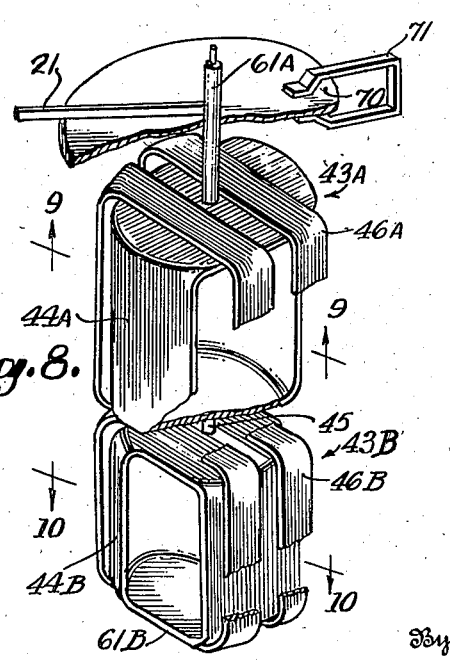
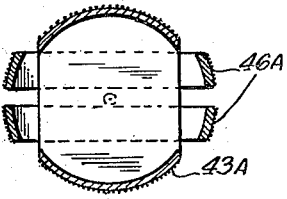
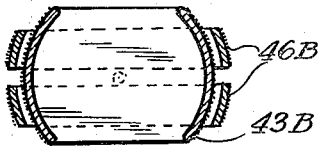
Inventor
JOHN R. STEINHOFF.

May 22, 1945. J. R. STEINHOFF 2,376,730
APPARATUS FOR SONIC DETECTION
Filed April 17, 1942 5 Sheets-Sheet 4

Inventor
JOHN R. STEINHOFF.
By Archibald R. McCallum
Attorney

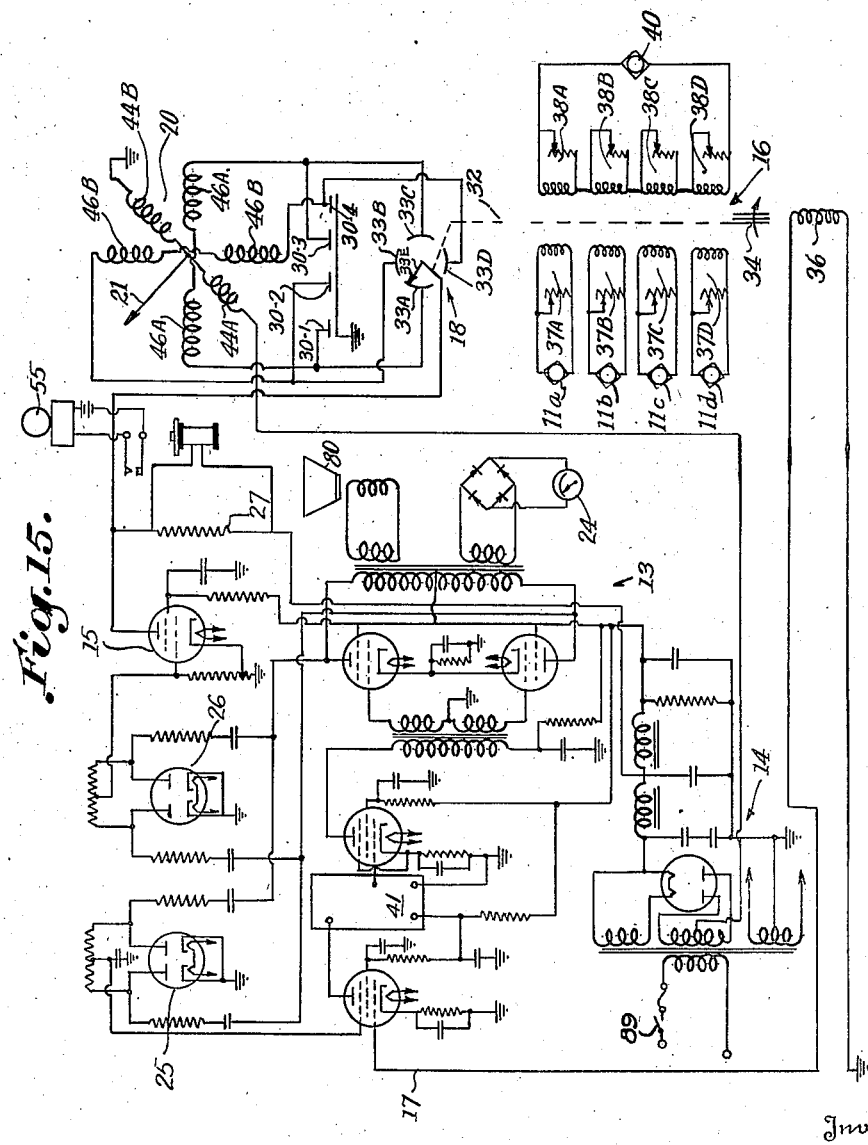

Patented May 22, 1945

2,376,730

UNITED STATES PATENT OFFICE 2,376,730

APPARATUS FOR SONIC DETECTION

John R. Steinhoff, Washington, D. C.

Application April 17, 1942, Serial No. 439,330

7 Claims. (Cl. 177—386)

This invention relates to improvements in a method of and apparatus for sonic directional finding and more particularly to a method of and apparatus for detecting by sound the direction of location of a vessel.

An object of the invention is to provide a reliable and efficient method of and apparatus for providing visual indication of the location of a craft with respect to a detection point.

Another object of the invention is to provide for direction finding a dynamometer type of instrument capable of rotating through three hundred sixty degrees.

Another object of the invention is to provide an improved method for determining the location of a source of sound transmitted under water.

Another object of the invention is to provide an improved system for determining the direction of an engine driven vessel by detecting the under-water sound thereof, including a plurality of submerged directional microphones, an audio-amplifier, and an instrument responsive to four series of interspersed signals amplified, rectified and again amplified separately, including provision for four separate D. C. potentials proportional to the series of signals.

Another object of the invention is conveniently to provide for signalling the presence of a vessel and indicating its direction and movement relative to a detection station.

Another object of the invention is to provide for accurately determining the range of a vessel with respect to a detection station.

Another object of the invention is to provide a reliable sonic method of and apparatus for locating vessels.

The above and other objects of the invention will be clearly understood by referring to the following detailed description and the accompanying drawings forming a part thereof, wherein Figure 1 is a schematic view showing installation of one form of apparatus embodying the invention;

Figure 2 is an enlarged detail showing schematically retracting mechanism for supporting the microphone housing;

Figure 3 is a horizontal section taken on the line 3—3, Figure 2;

Figure 4 is a schematic view showing the coil and rotary scanning mechanism;

Figure 5 is a perspective view of the scanning mechanism;

Figure 6 is a section taken on the line 6—6, Figure 4;

Figure 7 is a view in elevation showing the face of the direction indicating instrument;

Figure 8 is a perspective view partly broken away showing the internal rotary and stationary coil portions of the instrument shown in Figure 7;

Figure 9 is a section taken on the line 9—9, Figure 8;

Figure 10 is a section taken on the line 10—10, Figure 8;

Figure 11 is an enlarged fragmentary view in detail showing the electrically conducting bearings for the instrument of Figure 7.

Figure 15 is a circuit diagram illustrating the principal phases of the electrical aspects of the system;

Figure 16 is a diagram depicting utilization of the system in accurate range finding; and Figure 17 is another diagram showing utilization of the system in accurate range finding.

Figure 14:
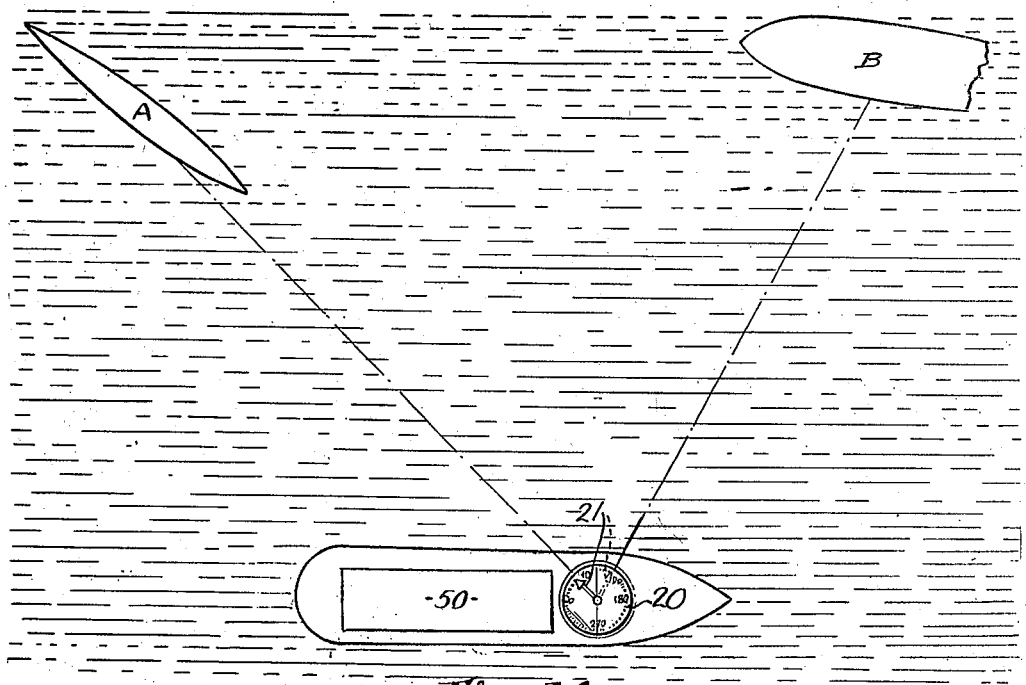
Figure 14 is a diagram illustrating the utilization of the system and the chart of Figure 13, and taking simultaneous bearings of two craft.

This device consists of the following four units:

(A) Sound pick-up means 10 (Figs. 1, 2 and 3), comprising four microphones 11a, 11b, 11c, 11d, station compensating microphone 40 and a streamline housing 12.

(B) Audio-frequency amplifier 13 (Fig. 15) including rectifier 26 and D. C. voltage amplifier 15.

(C) Special apparatus 16 (Figs. 4–6 and 15) to inductively couple the four microphones to the input 17 of the audio-frequency amplifier, separately and in sequence to provide four series of signals to the input of the amplifier, and simultaneously connect the output 18 of the D. C. amplifier to provide four separate D. C. potentials.

(D) Especially designed electrical instrument 20 (Figs. 1, 7–10 and 15) having a pointer 21 capable of rotating through 360°.

The four microphones are located in the streamlined housing under water. These microphones 11a, 11b, 11c and 11d having directional characteristics are positioned in the streamlined housing so that the surface of each microphone is at a 90° angle, one to the other, and are responsive to sound waves in a horizontal plane as shown in Figure 3. A fifth microphone 40 is preferably positioned in the same housing responsive to sound waves in a vertical plane, as shown in Fig. 2, thereby providing means for cancelling the effect of station noise.

The audio-amplifier and associated apparatus is contained in a metal case 22 (Fig. 1), and a control panel (not shown) is provided to adjust the various components. The overall amplifier voltage gain is approximately 9,400, and provides aural reception through speaker 80 and a gain indicator 24 which may be calibrated to provide approximate range. Delayed automatic volume control 25 allows the amplifier to be maintained at maximum, and decreases the gain proportionately with increasing input voltage. The output of the audio-frequency amplifier is rectified by a 6H6 tube 26, as shown in Figure 15, so as to provide a D. C. potential, directly proportional to the audio-frequency voltage applied to the amplifier at any given instant. The voltage is negative with respect to ground and is applied to the control grid of the D. C. amplifier 15, which in turn, regulates the flow of plate current through the resistor 27.

The 6AG7 tube 15, connected as shown in Figure 15, has a plate dissipation of 50 milliamperes with a zero grid voltage, and cuts off with a four volt negative grid bias; therefore variations in the grid bias will cause a voltage drop across the resistor 27 proportional to variations of audio-frequency intensities applied to the input of the amplifier.

A zero signal input results in a minimum D. C. potential between ground and the plate of the 6AG7 tube 15; an increase in signal voltage to the amplifier, results in a proportionate increase in D. C. potential on the plate of the 6AG7 tube 15.

The plate of the 6AG7 tube 15 is sequentially connected to four condensers, 30—1, 30—2, 30—3 and 30—4.

Apparatus for sequentially connecting the input of the amplifier to the four microphones is illustrated in Figures 4, 5 and 6.

A motor driven shaft 32 rotates switch contact 33—e between segments 33—a, 33—b, 33—c, and 33—d; and also the rotary core 34 shown in Figures 4, 5, 6 and 15.

This assembly includes a secondary winding 36, four primary coils 37a, 37b, 37c, 37d, and four bucking coils 38a, 38b, 38c and 38d as shown in Figure 6.

The secondary winding is connected to the input of the audio-amplifier. The rotary core inductively connects the primaries 37 separately and in the following sequence, primaries a, b, c, d, to the secondary winding.

As the ends of the rotary core 34 are fanned out to a 90° angle, each primary is inductively coupled to the secondary for the duration of one-fourth of a complete revolution. The primary coils are so arranged that coupling between secondary and one primary coil is not interrupted until inductive coupling is established with the following primary winding in the rotation of the core.

Contact from 33e to 33a is maintained during the period that primary 37a is inductively coupled with the secondary winding, rotating the aforementioned shaft, 33e is connected to 33b for the duration of the inductive coupling of the secondary winding to primary 37b.

Thereafter in sequence, the plate of the 6AG7 tube 15 will be connected to contact 33c when primary 37c is inductively coupled to the amplifier input, and also 33d will be connected to 33e when primary 37d is inductively coupled to the secondary winding.

The four primaries 37a, 37b, 37c and 37d are connected separately to the four directive microphones 11a, 11b, 11c and 11d, as shown in Figure 15, and each microphone has a separate gain control.

The four primary windings 37 are located on stationary cores as shown in Figures 4, 5 and 6, opposite the bucking coils having equal inductance, and connected as shown in Figure 15.

The bucking coils are so connected that when A. C. voltages are equal in frequency and intensity in primary 37a and bucking coil 38a the resulting magnetic flux in the core 34 will cancel out, and not create any voltage in the secondary winding.

Bucking coils 38a, 38b, 38c and 38d are connected in series with a noise compensating microphone 40 and each coil has a separate gain control.

Variable band pass filter 41 in Figure 15 includes a frequency selector switch 51, each tap thereof making connections in an inductive capacity network so that each tap sharply attenuates at a specific resonant frequency. The ten resonant frequencies are divided over the entire frequency range used, and remotely operated. Operation of variable band pass filter 41 will be described hereinafter.

The electrical indicating instrument 20 (Figs. 7–10 and 15) has a scale 42 calibrated in degrees, and the pointer 21 rotates through 360° as shown in Figure 7. This meter is of special design and consists of two opposed dynamometers 43a and 43b, the moving coils 44a and 44b being mechanically attached to each other by a spacer 45 and to the common pointer 21. The moving coils 44a and 44b are energized by a fixed D. C. potential and rotate in accordance with the voltages and polarity across the fixed coils 46a and 46b, the moving coils being attracted or repelled by the stationary coils.

As shown in the wiring diagram of Figure 15, the two stationary coils 46a and 46b are connected to the four condensers 30—1, 30—2, 30—3 and 30—4, and the indicating pointer 21 is rotated to a position determined by the differential potential resulting from differences of the sound level picked up by the four microphones.

When the equipment is installed, the main power switch 89 is turned on and the motor which operates the rotary core shaft 32 (Fig. 6) is turned off. An audio tone is applied to the four microphones, the sound level equal to each, each microphone gain control being set to maximum. Then, observing the gain indicator 24, the rotary core 34 is turned manually. Noting the gain level from each of the four channels, the gain of the microphones is decreased until the indicator 24 shows that the four microphones apply equal voltages to the input of the amplifier, then the tone is shut off.

When the ship is in normal operation, and with the rotating core motor still turned off, secondary 36 is inductively coupled with primary 37a, and the control across bucking coil 38a is adjusted to zero noise level, using either the gain indicator or speaker. Thereafter bucking coil 38b is adjusted to a null, continuing the same procedure with bucking coils 38c and 38d. The motor for the rotary core shaft 32 is then turned on to put the system into operation. The system should be in continuous operation and the meter 20 remotely located in a position so that it can be constantly observed.

Figures 12, 12A:
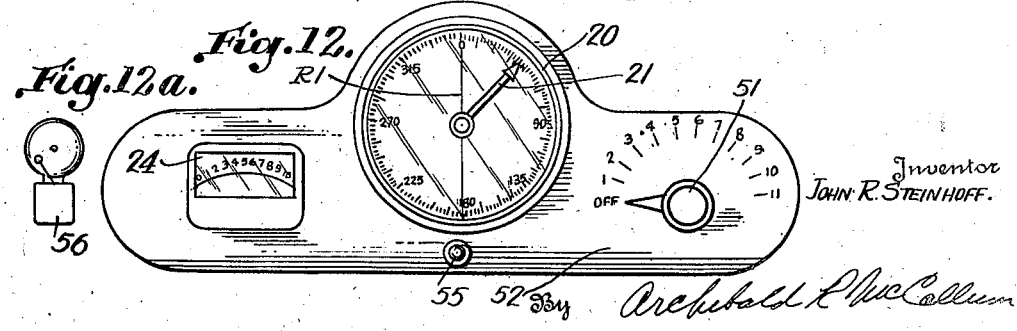
Figure 12 is an elevational view showing one type of master panel for controlling operation of the system.
Figure 12a is a detail showing an audible alarm which might be employed in the circuit in lieu of the alarm light shown in Figure 12.

To operate the frequency selector switch in variable band pass filter 41, an adding and subtracting stepping relay is connected thereto, which is actuated by a remote pulsing switch 51 (Fig. 12).

As soon as an unseen vessel comes within the range of the system, the audio currents increase to a certain intensity, actuating time delay relay 54 to light alarm bulb 55 or ring alarm bell 56. The attendant then operates selector switch 51, which in turn inserts band pass filters of variable band pass filter 41, thus allowing passage of only a narrow band of frequencies. He looks at direction meter 20 and turns the selector switch. If meter pointer 21 remains in the same position, the presence of but one craft is established, and its true bearing is indicated in line with the pointer. If in rotating the selector switch the pointer should swing, the presence of more than one craft is established.

By calibrating the selector switch to express the frequencies being amplified at each stop and by noting the level of signal being picked up as seen on gain indicator 24, it is practicable to identify craft by type. If curves were plotted for different vessels and their sounds, no two vessels would have identical curves. For example, sound waves from a large tanker B have peak frequencies in lower range of the audio spectrum; whereas a submarine A will register a peak in the neighborhood of 16 or 17 M cycles, as indicated by curves A1 and B1, respectively, see Fig. 13.

Figure 13:
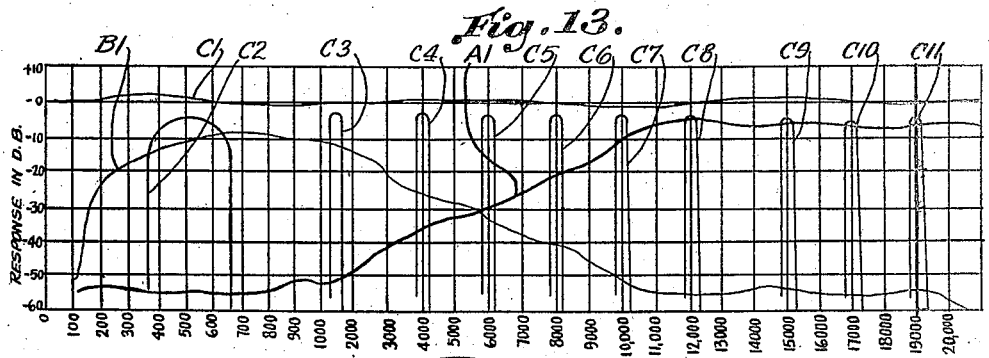
Figure 13 is a chart showing two imaginary curves depicting the sound characteristics of two vessels and illustrating the utilization of the band pass filters.

Figure 13 is a graph illustrating the amplifying characteristics of the audio-amplifier and also showing the two imaginary curves depicting comparative intensities at different frequencies from two crafts within the range of the detector system. With the detection apparatus installed on craft 50, Figures 1 and 14, unseen craft A and B will be noted. Curve A1 indicates sound radiated by craft A while curve B1 indicates sounds radiated by craft B.

Remote control panel 52 of Figure 12 carrying selector switch 51 is provided with 12 stops, the first thereof indicating the OFF position. When selector switch 51 (Figure 12) is placed on stop 1, the amplifier has the characteristics of curve C1, being relatively flat from 30 to 20,000 cycles. At stop 2, a band pass filter is inserted in the amplifier so as to depict the characteristics of curve C2 allowing the amplification of only the frequencies from 350 to 650 cycles and rejecting all other frequencies. Moving selector switch to stop 3 changes the frequency selector switch in the amplifier to another band pass filter resulting in curve C3; and utilization of the stops 4 to 11 successively respectively connect band pass filters to produce curves C4 to C11 sequentially.

An essential element in the present invention is meter or instrument 20, similar to the device covered in my copending application Serial No. 417,835, filed Nov. 4, 1941, and similar to a dynamometer in construction. Moving coils 44a and 44b rotate within two stationary coils 46a and 46b, their movement being governed by magnetic energies only, no springs being used therein. Two pivots 61a and 61b are attached to the moving coils as shown in Fig. 8, and the pointer 21 is fixed to the top pivot 61a to extend at a 45 degree angle to the moving coils. Pivots 61a and b rotate freely in adjusting screws, the latter being recessed with communicating areas fixedly receiving a bored jewel 64 and mercury P for maintaining electrical contact with a fine wire Q of platinum or other conductive material on the tip of the pivot, see Fig. 11. As the moving coils must rotate through three hundred sixty degrees, it is necessary to mount the top screw in glass R on the indicator top. A fine wire R1 is connected to the screw and extended across the glass, see Fig. 7.

As shown in the wiring diagram of Fig. 15, a fixed potential is applied to the moving coils 44a and 44b, and the resulting magnetic lines of force are always in the same direction and of the same intensity. The moving coils are attracted to or repelled from the stationary coils by a force depending upon the direction and amount of current flowing through the stationary coils, thereby causing the moving system of the instrument to rotate to a position corresponding to the directional orientation of the signals.

To damp the instrument pointer 21, an aluminum disc 70 is fixed to pivot 61a to rotate in the magnetic field of permanent magnet 71, as shown in Fig. 8.

As the microphone housing must be located below the hull it is retractable by the mechanism of Fig. 2. Well 81 in the hull contains plunger 82 forced down by pressure in chamber 83 through inlet 84. When plunger 82 is down pin 86 rests in slot 85 to lock same and valve 87 is closed. Solenoid 88 releases the pin to permit retraction of the housing by pressure of the water.

What I claim is:

1. In a sonic direction finding device, four directionally responsive microphones divergently directed at an angle of 90° one to the other in a horizontal plane, a direction indicator responsive to signals from said microphones, means for impressing signals from each of said microphones upon said indicator in a sense directionally oriented in correspondence with the direction of said microphones, a further microphone positioned to receive substantially only station noise, and means for reducing the signals from each of said first microphones in proportion to the strength of the signal from said further microphone.

2. In a sonic direction finding device, four directionally responsive microphones divergently directed in a horizontal plane, a direction indicator responsive to signals from said microphones, means for impressing signals from each of said microphones upon said indicator in a sense directionally oriented in correspondence with the direction of said microphones, including four primary windings each connected to one of said microphones and positioned on individual cores around a secondary winding, a rotatable core inductively coupling each primary winding to the secondary winding in sequence, and means for connecting said secondary winding to said direction indicator in said directional sense in synchronism with the rotation of said core.

3. In a sonic direction finding device, four directionally responsive microphones divergently directed in a horizontal plane, a direction indicator responsive to signals from said microphones, means for impressing signals from each of said microphones upon said indicator in a sense directionally oriented in correspondence with the direction of said microphones, including four primary windings each connected to one of said microphones and positioned on individual cores around a secondary winding, a rotatable core inductively coupling each primary winding to the secondary winding in sequence, a further microphone positioned to receive substantially only station noise, coils equal in inductance and opposite in phase to said primary windings and connected to said further microphone mounted on each of said individual cores to induce therein a counter magnetic flux, and means for connecting said secondary winding to said direction indicator in said directional sense in synchronism with the rotation of said core.

4. In a sonic direction finding device, four directionally responsive microphones divergently directed at an angle of 90° one to the other in a horizontal plane, a direction indicator responsive to signals from said microphones, means for impressing signals from each of said microphones upon said indicator in a sense directionally oriented in correspondence with the direction of said microphones, including an audio frequency amplifier for said signals, a plurality of band pass filters tuned to different audio frequencies, and means for separately selecting said filters to distinguish between two or more sound sources by the distinctive frequency characteristics of said sources.

5. In a sonic direction finding device, four directionally responsive microphones divergently directed at an angle of 90° one to the other in a horizontal plane, a direction indicator responsive to signals from said microphones, means for impressing signals from each of said microphones upon said indicator, including an audio frequency amplifier, switch means successively connecting said microphones to said audio frequency amplifier, means for rectifying the output of said amplifier to provide unidirectional potentials proportional to the signals from said microphones, a grid-controlled vacuum tube having a resistance in the plate circuit, means for impressing said unidirectional potentials on the grid of said tube, and switch means for impressing the resultant potentials from the plate of said tube upon said indicator in a sense directionally oriented with the direction of the corresponding microphones and in synchronism with said first switch means.

6. In a sonic direction finding device, four directionally responsive microphones divergently directed in a horizontal plane, a direction indicator responsive to signals from said microphones, means for impressing signals from each of said microphones upon said indicator in a sense directionally oriented in correspondence with the direction of said microphones, including four primary windings each connected to one of said microphones and positioned on individual cores around a secondary winding, a rotatable core inductively coupling each primary winding to the secondary winding in sequence, means connecting said secondary winding to said direction indicator, including an audio frequency amplifier, means for rectifying the output of said amplifier, and a quadripole rotary switch mechanically connected to said rotatable core and electrically connecting the rectified output of said amplifier with said direction indicator in different successive directional orientation in synchronism with the coupling effected by said core to provide a series of unidirectional potentials proportionate to the four interspersed series of signals induced in said secondary winding.

7. In a sonic direction finding device, four directionally responsive microphones divergently directed in a horizontal plane, a direction indicator responsive to signals from said microphones, means for impressing signals from each of said microphones upon said indicator in a sense directionally oriented in correspondence with the direction of said microphones, including four primary windings each connected to one of said microphones and positioned on individual cores around a secondary winding, a rotatable core inductively coupling each primary winding to the secondary winding in sequence, means connecting said secondary winding to said direction indicator, including an audio frequency amplifier, means for rectifying the output of said amplifier, a quadripole rotary switch mechanically connected to said rotatable core and electrically connecting the rectified output of said amplifier with said direction indicator in different successive directional orientation in synchronism with the coupling effected by said core to provide a series of unidirectional potentials proportionate to the four interspersed series of signals induced in said secondary winding, and condensers connected to each pole of said rotary switch to maintain the value of the potentials during the period that said poles are disconnected.

JOHN R. STEINHOFF.